United States Patent
Taylor et al.

(10) Patent No.: US 8,490,356 B2
(45) Date of Patent: Jul. 23, 2013

(54) MORTARLESS TILE INSTALLATION SYSTEM AND METHOD FOR INSTALLING TILES

(71) Applicant: Custom Building Products, Inc., Seal Beach, CA (US)

(72) Inventors: Steven L. Taylor, Glendora, CA (US); Norman C. Tracy, Huntington Beach, CA (US); Charles R. Cornman, Huntington Beach, CA (US); John W. McMullen, Long Beach, CA (US); Thomas R. Peck, Laguna Hills, CA (US)

(73) Assignee: Custom Building Products, Inc., Seal Beach, CA (US)

( * ) Notice: Subject to any disclaimer, the term of this patent is extended or adjusted under 35 U.S.C. 154(b) by 0 days.

(21) Appl. No.: 13/664,045

(22) Filed: Oct. 30, 2012

(65) Prior Publication Data

US 2013/0047538 A1    Feb. 28, 2013

Related U.S. Application Data

(63) Continuation-in-part of application No. 12/719,799, filed on Mar. 8, 2010, now Pat. No. 8,302,366.

(60) Provisional application No. 61/158,659, filed on Mar. 9, 2009.

(51) Int. Cl.
*E04B 1/00* (2006.01)
*E04C 1/00* (2006.01)

(52) U.S. Cl.
USPC .................................. 52/309.3; 52/309.1

(58) Field of Classification Search
USPC .................................. 52/309.1–309.5, 309.13
See application file for complete search history.

(56) References Cited

U.S. PATENT DOCUMENTS

| | | | | |
|---|---|---|---|---|
| 5,300,171 A | * | 4/1994 | Braun et al. | 156/249 |
| 5,418,036 A | | 5/1995 | Tokikawa et al. | |
| 5,527,853 A | | 6/1996 | Landy et al. | |
| 5,593,759 A | * | 1/1997 | Vargas et al. | 428/200 |
| 5,831,766 A | * | 11/1998 | Martin et al. | 359/529 |
| RE36,042 E | | 1/1999 | Landy et al. | |
| 7,338,685 B2 | | 3/2008 | Sano | |
| 2004/0004002 A1 | * | 1/2004 | Thompson et al. | 205/118 |
| 2006/0107617 A1 | | 5/2006 | Scott et al. | |
| 2008/0008849 A1 | * | 1/2008 | Mazurek et al. | 428/40.1 |
| 2010/0086778 A1 | * | 4/2010 | Fidan et al. | 428/352 |
| 2011/0039067 A1 | * | 2/2011 | Seth et al. | 428/141 |

FOREIGN PATENT DOCUMENTS

| | | |
|---|---|---|
| DE | 196 20 987 C1 | 11/1997 |
| DE | 202 04 518 U1 | 8/2002 |

(Continued)

*Primary Examiner* — Mark Wendell
(74) *Attorney, Agent, or Firm* — Fulwider Patton LLP

(57) ABSTRACT

The installation system and method for installing an architectural covering material to a substrate surface utilizes an adhesive mat having layers of adhesive and release layers arranged to allow the covering material to be initially positioned, and later repositioned to be permanently set. The adhesive mat includes a planar carrier member, one or more adhesive layers on at least one planar side of the planar carrier member, and at least one release layer of material removably covering the one or more adhesive layers. In one form, the adhesive mat includes a carrier sheet, first and second adhesive layers on opposing planar sides of the carrier sheet, and first and second release layers of material removably covering the two adhesive layers.

20 Claims, 9 Drawing Sheets

FOREIGN PATENT DOCUMENTS

| | | |
|---|---|---|
| EP | 0478084 A1 | 9/1991 |
| GB | 2 192 336 A | 1/1988 |
| JP | 2002121503 | 4/2002 |
| NL | 9 002 083 A | 8/1991 |
| WO | 2004/051019 A1 | 6/2004 |
| WO | 2008/038982 A1 | 4/2008 |

* cited by examiner

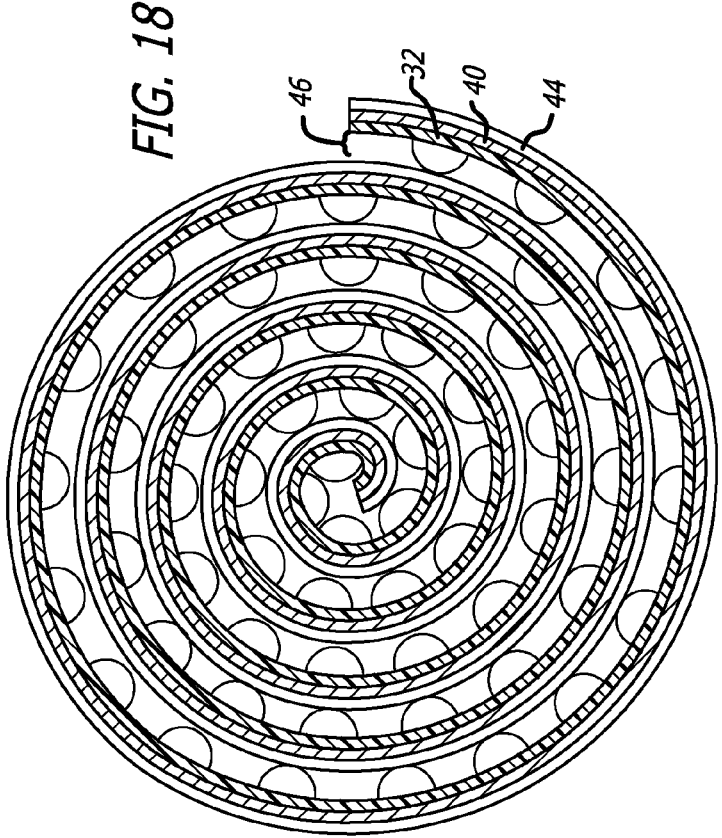
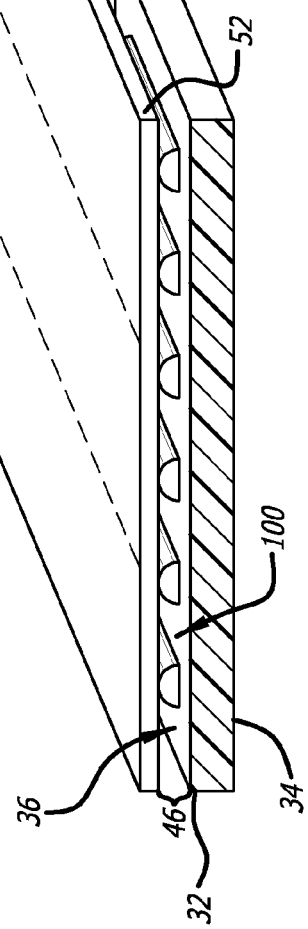

_US 8,490,356 B2_

MORTARLESS TILE INSTALLATION SYSTEM AND METHOD FOR INSTALLING TILES

CROSS-REFERENCES TO RELATED APPLICATIONS

This application is a continuation in part of U.S. patent application Ser. No. 12/719,799, filed on Mar. 8, 2010, now U.S. Pat. No. 8,302,366, which is based upon U.S. Provisional Application No. 61/158,659, filed Mar. 9, 2009, incorporated by reference herein.

BACKGROUND

This invention relates generally to an adhesive mat, a system, and a method for installation of an architectural covering material to a substrate surface. The invention relates more particularly to mortarless installation of an architectural covering material such as tile utilizing an adhesive mat with layers of adhesive and release liners arranged to allow the covering material to be temporarily positioned, and re-aligned, repositioned and set as desired in a final position.

Covering materials such as tile are typically adhered to a substrate surface such as a wall or a floor using a cement-based mortar, which can be difficult and time consuming. The mortar is typically prepared by mixing a mortar powder with water until the mortar mixture has a desired pasty consistency so that the mortar mixture can be applied with a trowel. One of the drawbacks of using mortar is that mortar powder is an inherently dusty material, and while the mortar powder is being mixed with water, the dust from the mortar can cover the surrounding area. Mortar dust is generally believed to be safe, although it can be a nuisance if it is inhaled. Another problem with using mortar is that the mortar powder and water also must be mixed in a specified proportion, or else the mortar may not adequately adhere to the tile, or may cure improperly.

A wet mortar mixture is typically applied to the substrate surface with a notched trowel to form ridges and valleys in the mortar over a desired coverage of the surface. After the mortar is spread it must be used within a certain period of time, and tile must be set into the mortar before the mortar "closes," and loses its ability to hold the tile. A person installing tile on mortar also must take great care to ensure that the tiles are properly aligned and positioned as desired, and this can be difficult, frequently requiring readjustment of tiles that have been laid on mortar. Unfortunately, mortar also has a certain adjustment time after which the positions of tiles set on it can not be adjusted. Thus, once mortar is spread, tile must be set in a final desired position on the mortar within a specified time. If too much mortar is spread before the tiles can be properly set before the mortar "closes," or if any necessary adjustment of the positions of the tiles on the mortar has not been completed before this no longer becomes possible, the mortar and tiles must be removed, and the mortar must be discarded. In addition, the spreading of mortar commonly requires the use of many different techniques that can be critical to the ultimate success of the tile installation, such as skim coating the substrate surface, "back buttering" the tile, keeping the trowel at a specified angle in order to deliver the right amount of mortar, and the like. Another difficulty with using mortar for setting tiles is that mortar is not typically sufficient by itself to provide waterproofing. Under current practice, if tile is to be set in an area exposed to water, a separate waterproofing material typically must be added to the tile installation.

Once tile is properly set on mortar, the mortar must be allowed to cure before the tile installation can be grouted and completed. This typically can take from 4 hours (for special rapid setting mortars) to many days. Although curing commonly occurs in 16-24 hours, mortar on which tile has been set is usually allowed to cure overnight, after which the tile is substantially immovable, and is ready for grouting. Grout is typically applied by smearing grout with a rubber float across the entire surface of the set tiles and down into the grout joints between the set tiles. Excess grout is then removed as well as possible with the float, and the grout joints are "dressed" using a damp sponge.

A two-sided asphaltic membrane is currently commercially available for installing tile without mortar. However, the strength of this adhesive is not sufficient to reliably hold the tile in place, especially on vertical applications. Examples of this type of asphaltic mat with a tackier asphaltic adhesive are also too sticky for the tiles to be easily repositioned. A pressure sensitive adhesive material is also known that can be used for installing tile, and that provides dots of protruding fibers that allow the tile to be repositioned once the tile is set on the adhesive material. A double-sided adhesive tape for flooring material is also known that includes an adhesive layer with bumps and dips designed to face either a substrate surface or flooring surface. The bumps are covered by non-adhesive particles that reduce the adhesive power per unit area of the tape. Convex portions of the adhesive layer are initially placed in contact with the ground surface so that the area of contact with the substrate or flooring material is small and rendered less adherent by the non-adhesive particles, so that the adhesive tape can be moved easily. In addition, the diameter of the convex portions is 0.01-0.5 mm with spacing between ridges of 0.1-1 mm, which is too small for many tiles, which do not have a flat bonding surface. Without enough adhesive present (i.e. larger diameter) this type of double-sided adhesive tape does not provide enough surface coverage on many tiles. After the position of the flooring material is finally determined, the flooring material can be pushed toward the substrate so that both the concave and convex parts of the adhesive layer contact the substrate to firmly adhere the flooring material to the substrate. A releasing liner is provided over the adhesive layer to keep the bumps and dips of the adhesive layer intact until the adhesive layer is to be applied to the ground surface. However, in each case, an additional waterproofing must be provided if it is needed. In addition, in each case, the adhesive article is designed for use with flooring materials adhered to horizontal flooring surfaces, and not architectural covering materials that can be adhered to vertical surfaces, such as ceramic tiles adhered vertically for backsplashes, tub surrounds, and the like. Adhering flooring materials does not require the adhesive power necessary for adhering heavier, more dense tiles to vertical surfaces.

There is therefore a need for a mortarless tile installation system that does not involve the problems associated with handling and mixing a powder by a user, that can provide a secure adhesion of more dense architectural covering materials to vertical surfaces, that allows repositioning of the architectural covering materials, and that can provide waterproofing and a sufficient bond to a variety of tiles for installation orientations ranging from horizontal to vertical. The present invention meets these and other needs.

SUMMARY OF THE INVENTION

Briefly and in general terms, the present invention provides for an adhesive mat, a system, and a method for installation of an architectural covering material such as tile to a substrate surface, with one or more layers of adhesive and one or more layers of release liners in the adhesive mat, in an arrangement that allows the covering material to be initially placed approximately in a desired position, and re-aligned and repositioned later to be permanently set in the desired position. The invention does not have limitations as to the timing of setting the covering material, and also avoids other problems commonly encountered in adhering a covering material with mortar powder. The adhesive mat provides a waterproof membrane, eliminating the need to provide an additional waterproof layer in installing the covering material, and the covering material can be grouted immediately after the covering material is permanently set in the desired position. A second optional component of the system is a premixed grout that strongly adheres to the tiles and to the mat, thereby increasing the overall strength and durability of the tile installation.

Accordingly, in a first presently preferred aspect, the present invention provides for a generally planar adhesive mat with a first side, an opposing second side, and a plurality of perimeter side edges for use in installing architectural covering material to a substrate surface. The generally planar adhesive mat includes a planar carrier member having first and second opposing planar sides, and a plurality of perimeter side edges, one or more adhesive layers on at least one of the two opposing planar sides, and one or more release layers of material removably covering the one or more adhesive layers to protect the one or more adhesive layers during manufacture and storage of the adhesive mat. In another aspect, the planar carrier member can be provided on one planar side with a layer of adhesive configured to removably adhere an architectural covering material to the adhesive mat in a first stage of installation, and to permanently adhere the architectural covering material to the adhesive mat in a second stage of installation, with a release layer of material removably covering the adhesive layer to protect the adhesive layer during manufacture and storage of the adhesive mat. The adhesive release layer of material is preferably configured to allow removal of portions of the adhesive release layer of material when installing the architectural covering material. Another layer of adhesive may optionally be provided on the opposing side of the planar carrier member, to provide an adhesive mat having two opposing adhesive layers but having only a single release layer, such as a double-sided release paper having release agents on both sides of the release paper. Thus, when adjacent mats, or areas of the same mat, come in contact, as when stacking multiple mats or rolling a single mat, both adhesive layers are protected by the single release layer. The planar carrier member can be formed of a semi-rigid board such as gypsum wallboard, cement backerboard, or foam backerboard, or can be formed as a carrier sheet of material.

In another presently preferred aspect, the planar carrier member is formed as a carrier sheet, and the one or more adhesive layers include a first adhesive layer on a first side of the carrier sheet configured to adhere the adhesive mat to the substrate surface, and a second adhesive layer on the opposing second side of the carrier sheet configured to removably adhere the architectural covering material to the adhesive mat in a first stage of installation, and to permanently adhere the architectural covering material to the adhesive mat in a second stage of installation. The one or more release layers of material can correspondingly include a first release layer of material removably covering the first adhesive layer to protect the first adhesive layer during manufacture and storage of the adhesive mat, and a second release layer of material removably covering the second adhesive layer to protect the second adhesive layer during manufacture and storage of the adhesive mat. The second adhesive release layer of material also can be formed to allow removal of portions of the release layer of material when installing the architectural covering material. The architectural covering material may be any commonly known in the art such as wood, carpet, tile, and the like, for example, whereby the adhesive mat replaces the adhesives commonly used to install the wood, carpet, tile, and the like, to the substrate.

In another presently preferred aspect, a portion of each carrier sheet along at least one of the plurality of perimeter side edges of the carrier sheet is free of adhesive to reduce the thickness along one or more of the plurality of perimeter side edges of the carrier sheets. In another presently preferred aspect, the carrier sheet may be formed with a grid, to assist a user in alignment of the adhesive mat. In another aspect, the carrier sheet is typically formed from a sheet material formed of a polymer, but more specifically may be formed from a sheet material selected from the group consisting of polyethylene, polypropylene, woven polyester, woven fiberglass, non-woven polyester, non-woven fiberglass. The carrier sheet may also be impermeable to liquid water but permeable to water vapor.

In another aspect, the first adhesive layer is typically formed of a pressure sensitive adhesive, and may be an adhesive such as a cured latex-based pressure sensitive adhesive, a hot melt pressure sensitive adhesive, an asphalt-based pressure sensitive adhesive, or an acrylate based pressure sensitive adhesive, for example. In another aspect, the first release layer of material is printable. In another aspect, the first pressure sensitive adhesive can be a slow set or weakly binding pressure sensitive adhesive, and the second adhesive layer can be a fast set or more strongly binding pressure sensitive adhesive, relative to the first pressure sensitive adhesive. In another aspect, the second adhesive layer is deformable when placed under pressure such that the second adhesive layer will conform to a surface of the architectural covering material. In another aspect, the second adhesive layer has sufficient adhesion such that an architectural covering material is removably adhered to the second adhesive layer in the first stage of installation with an adhesive force substantially equal to the mass per unit area of the architectural covering material in a vertical position, and the architectural covering material can be removed by hand pressure equal to or greater than the mass per unit area of the architectural covering material in the first stage of installation. In another aspect, the second adhesive layer has sufficient adhesion such that an architectural covering material, such as a tile, for example, will removably adhere to the second adhesive layer in the first stage of installation with an adhesive force such that when the architectural covering material is adhered to the second adhesive layer with minimal pressure in a vertical position, such as a force of about 0.01 to 1.0 pounds per square inch, for example, the architectural covering material is still removable with minimal hand pressure, such as equal to or greater than about 1.0 pound per square inch, for example, and in a subsequent second step of installation to permanently affix the architectural covering material to the second adhesive layer, the architectural covering material can be firmly pressed into place by applying a load of about 10 pounds or more across the face of the architectural covering material.

In another presently preferred aspect, the second adhesive layer on the opposing second side of the carrier sheet includes a plurality of ridges and corresponding valleys disposed between the ridges. The ridges may be formed from a first pressure sensitive adhesive, and the corresponding valleys may be formed of a pressure sensitive adhesive functionally the same or different from the first pressure sensitive adhesive. For example the first pressure sensitive adhesive may be a slow set or weak binding pressure sensitive adhesive, and the second pressure sensitive adhesive may be a fast set or more strongly binding pressure sensitive adhesive, relative to the first pressure sensitive adhesive. In one aspect, the ridges and corresponding valleys may be formed from stacked layers of adhesives. The ridges and corresponding valleys may be formed from dots of adhesive, such as where the ridges are formed as high dots and the corresponding valleys are formed as low dots, for example, and the high dots and the low dots are formed from stacked layers of adhesives. Alternatively, the valleys may optionally contain no adhesive, and the ridges may be continuous or discontinuous (i.e. dashed).

In another aspect, the second release layer of material can be a release paper, and may be printable. The second release layer of material may also be modified to allow removal of portions of the release layer of material, and for example may be perforated to define a plurality of tear lines in the second release layer of material forming a plurality of removable portions of the second release layer of material, or may be formed as a plurality of separated strips.

In another presently preferred embodiment, the present invention provides for a method for installing a plurality of portions of architectural covering material to a substrate surface, and includes the steps of providing a plurality of the generally planar adhesive mats, removing the first release layer of material from each of the plurality of generally planar adhesive mats, and applying the plurality of generally planar adhesive mats to the substrate surface with the first adhesive layer of each of the generally planar adhesive mats contacting the substrate surface. At least a portion of the second release layer of material is removed from each of the plurality of generally planar adhesive mats, and the plurality of portions of architectural covering material are applied to the second adhesive layer of the plurality of generally planar adhesive mats. The plurality of portions of architectural covering material are then repositioned on the second adhesive layer of the plurality of generally planar adhesive mats, and the plurality of portions of architectural covering material are permanently applied to the second adhesive layer of the plurality of generally planar adhesive mats. In another aspect, the second release layer of material is perforated to define a plurality of tear lines in the second release layer of material forming a plurality of removable portions of the second release layer of material, and the step of removing at least a portion of the second release layer of material involves tearing the second release layer of material along at least one of the tear lines to remove at least a portion of the second release layer of material. In another aspect, a portion of at least one of the plurality of perimeter side edges of the carrier sheet is free of adhesive, and the step of applying the plurality of generally planar adhesive mats to the substrate surface involves overlapping adjacent ones of the plurality of generally planar adhesive mats to allow continuous waterproofing of the substrate surface without significantly changing the thickness of the plurality of generally planar adhesive mats. In another aspect, the carrier sheet is formed with a grid, and the step of applying the plurality of generally planar adhesive mats to the substrate surface involves aligning the plurality of generally planar adhesive mats with the grid. In another presently preferred variation, the ridges may be discontinuous, or dashed, such that there is a gap of from 0.1 to 0.5 inch between successive ridges of adhesives. This allows the mat to be cut such that two mats can be overlayed in the direction of the ridges and form a waterproof seal.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 18 is an end view of a roll formed from the generally planar adhesive mat of FIG. 16.

FIG. 19 is a schematic perspective view of a sixth embodiment of a generally planar adhesive mat for installation of architectural covering material to a substrate surface, according to the present invention.

DETAILED DESCRIPTION OF THE PREFERRED EMBODIMENTS

While conventional double-sided adhesive sheet materials exist that can be used for installing covering materials such as tile to a substrate surface without mortar, once the covering materials are initially set on this material, they typically can not be easily repositioned or realigned. While a pressure sensitive adhesive material with dots of protruding fibers and a double-sided adhesive tape with bumps and dips for flooring material can be used for installing and repositioning tile, if waterproofing is required, additional waterproofing must be provided separately. While a pressure sensitive adhesive material with protruding dots or with bumps and dips can be installed horizontally for use as flooring material, if application to a vertical substrate is required, additional adhesive strength must be provided, potentially compromising repositionability of the material.

Figure 1:
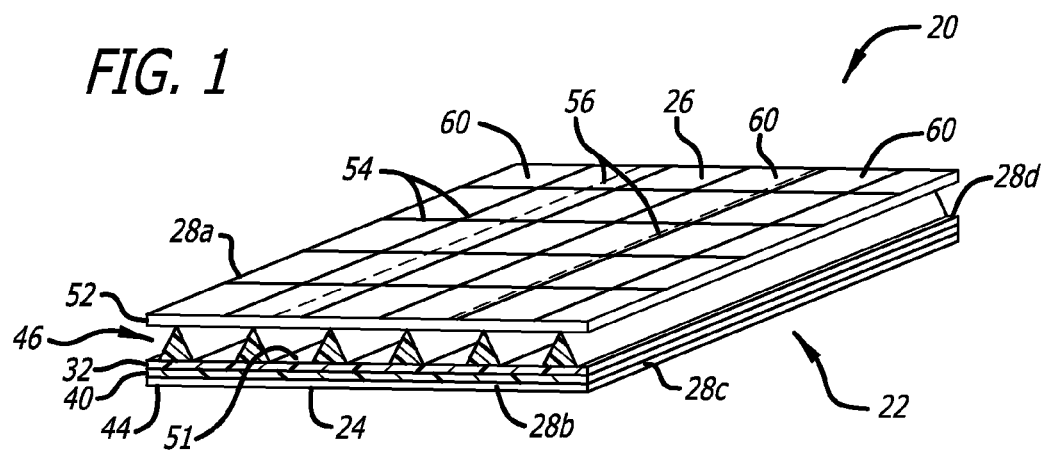
FIG. 1 is a schematic perspective view of a first embodiment of a generally planar adhesive mat for installation of architectural covering material to a substrate surface, according to the present invention.
Figure 2:
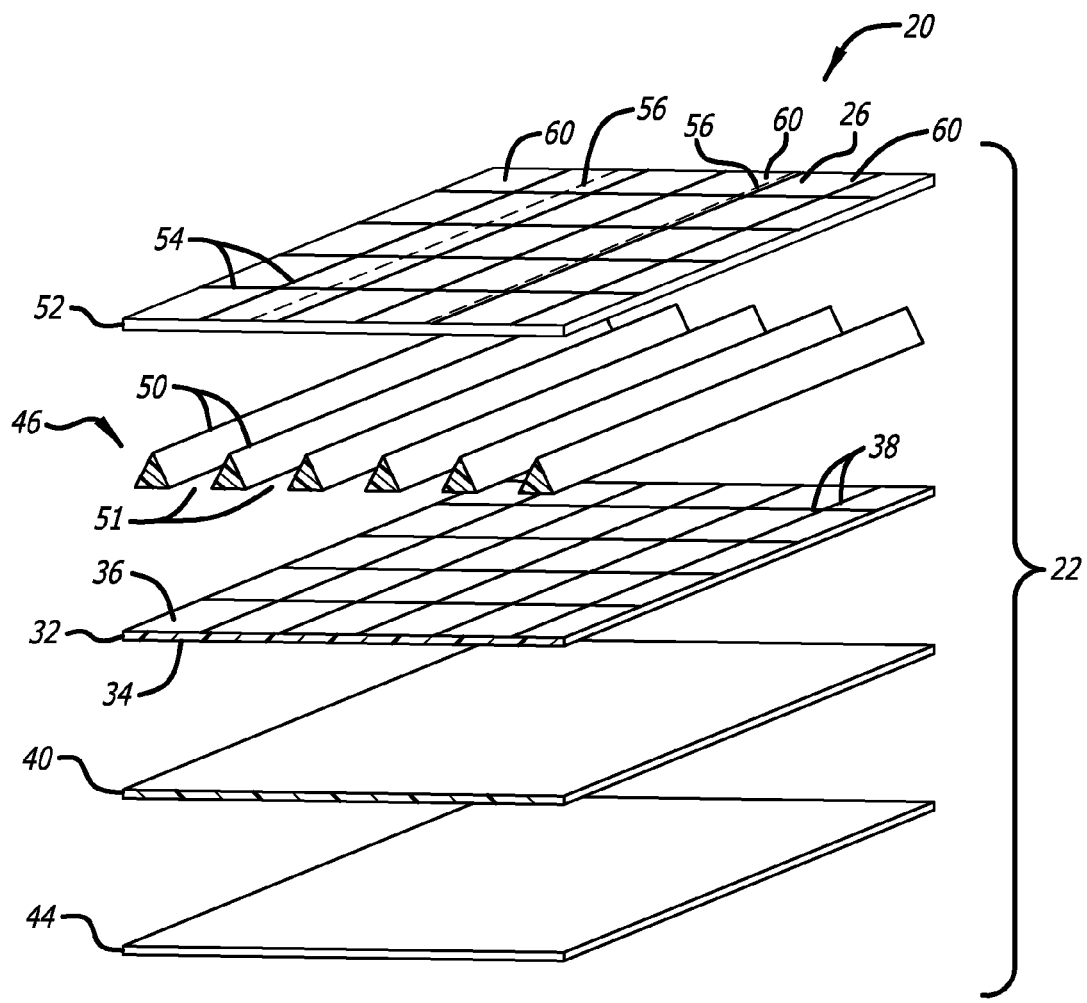
FIG. 2 is an exploded view of the generally planar adhesive mat of FIG. 1, according to the present invention.
Figure 3:
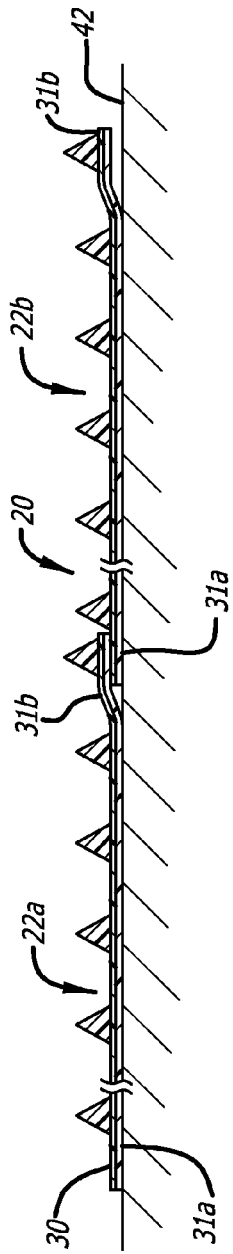
FIG. 3 is a side elevational view of a plurality of overlapping carrier sheets of a plurality of generally planar adhesive mats according to the present invention, shown without the release layers for simplicity.
Figure 5:
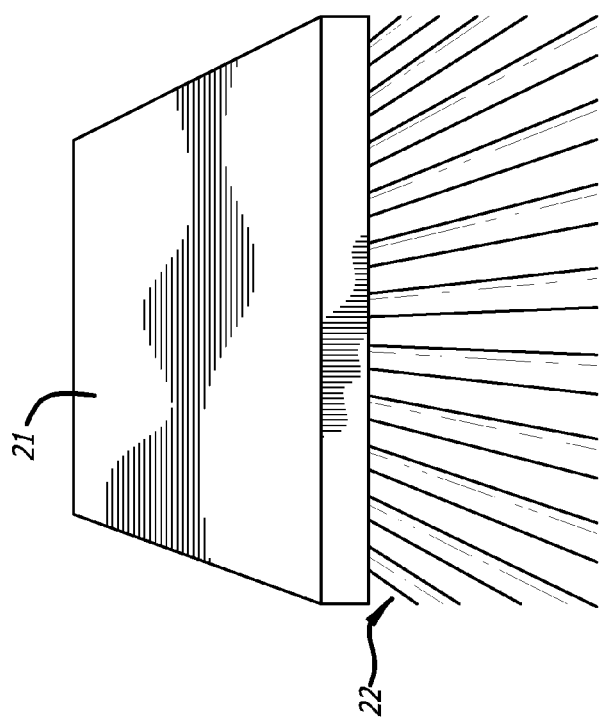
FIG. 5 is a side perspective view of an edge of a tile of FIG. 4 applied to the generally planar adhesive mat of FIG. 1.
Figure 4:
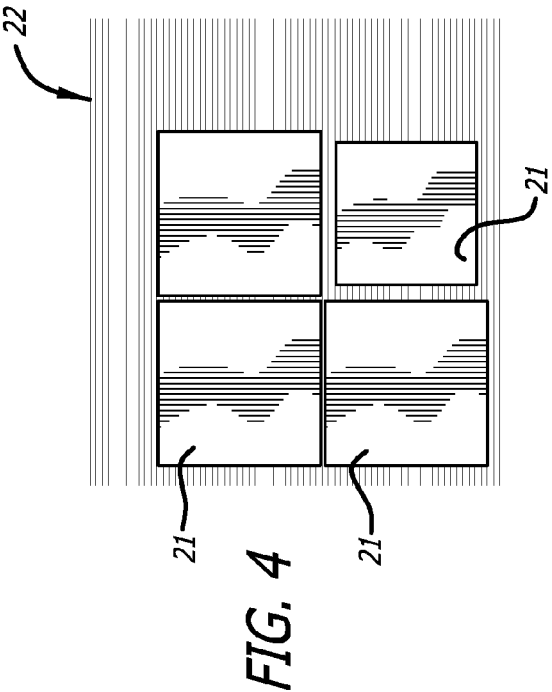
FIG. 4 is a top plan view of a plurality of tiles applied edge to edge to the second adhesive layer of the generally planar adhesive mat of FIG. 1 to form a plurality of joints between adjacent sections of architectural covering material.

Accordingly, in a first embodiment illustrated in FIGS. 1-5, the present invention provides for a tile installation system 20 for installing an architectural covering material 21 to a substrate surface, such as a wall, floor, counter, backsplash, tub/shower surround, or other building surface. The architectural covering material may be any commonly known in the art such as wood, carpet, tile, brick fascia, linoleum and the like, for example, whereby the adhesive mat replaces the adhesives commonly used to install the architectural covering material to the substrate. The system of the invention utilizes one or more generally planar adhesive mats 22, such as a plurality of mats 22a, b, each having a first side 24 and an opposing second side 26 and a plurality of perimeter side edges 28a, b, c, d. Referring to FIG. 3, in a presently preferred aspect, at least one perimeter side edge 30 of the mat is free of a second adhesive layer on the second side 26 of the mat to reduce the thickness at that edge portion of the mat to allow overlapping of adjacent mats to provide continuous waterproofing, without significantly changing the height of the mat from the substrate surface. The mat typically includes a plurality of perimeter side edges 31a, b configured to allow overlap of an adjacent perimeter side edge of an adjacent mat. Referring to FIGS. 1 and 2, each mat includes a core planar carrier member or carrier sheet 32 having a first side 34 and an opposing second side 36. The carrier sheet can be formed with a grid 38, such as by printing of the grid on the carrier sheet, for assisting a user to align the adhesive material to the substrate and to align the covering material on the mat.

The carrier sheet for the adhesive mat is preferably formed of a sheet material, such as a flexible or inflexible polymeric material, such as polyethylene or polypropylene sheets, or other similar materials, for example, although it is preferred that the carrier sheet be formed of a sheet material that is flexible, so that it can be manufactured in a roll. The carrier sheet material may also be formed of woven and non-woven mats, such as polyester or fiberglass or other similar materials, for example. The carrier sheet also preferably should be moderately deformable so that the adhesive mat can be adhered to slightly uneven surfaces without wrinkling. The carrier sheet also preferably should be impermeable to liquid water and water vapor, i.e. so that the adhesive mat can be used in wet areas such as shower and tub surrounds, although in some applications it can be desirable for the carrier to be impermeable to liquid water, but permeable to water vapor, so that the carrier sheet can act to provide protection against liquid water while still allowing the underlying substrate to "breathe." In order to provide assistance to a user in aligning and positioning covering materials installed on the adhesive mat of the invention, it is also preferable that the carrier sheet should be printable, so that it can be provided with a grid, or another measuring and aligning system, for example, since this can facilitate more accurate placement of covering material on the adhesive mat. Preferred properties of the carrier sheet may be significantly different for different uses of the invention. For instance, a user may desire a flexible carrier sheet for use on tub surrounds and back splashes, a rigid carrier for flooring applications, or an inflexible carrier such as backerboard or a sheetrock-like material for use of the adhesive mat of the invention as construction panels. Deformability of the adhesive mat can allow the adhesive mat to be applied despite minor deflections in a substrate surface without creating wrinkles in the adhesive mat, which might otherwise prevent the effective placing of a covering material on the adhesive mat.

The adhesive mat includes a first adhesive layer 40 on the first side of the carrier sheet configured to adhere the adhesive mat to a substrate surface 42, illustrated in FIG. 3. The first adhesive layer can be any one or a combination of a number of cured or pressure sensitive adhesives (PSAs) commonly known in the art, including asphalt-based PSAs (rubberized or otherwise) and acrylate based PSAs, for example. The first adhesive layer should provide a rapid and permanent bond to the substrate surface. In a presently preferred aspect, the first adhesive layer is composed of a PSA applied in a thin layer to the first side of the carrier sheet.

The adhesive mat also includes a first release layer of material 44, such as a release paper, for example, removably covering the first adhesive layer to protect the first adhesive layer during manufacture and storage of the adhesive mat. The first release layer of material is also preferably printable, so that it can also be printed with a grid, or another measuring and aligning system, for example, in order to facilitate more accurate placement of covering material on the adhesive mat by a user.

The adhesive mat also includes a second adhesive layer 46 on the second side of the carrier sheet configured to adhere the architectural covering material to the adhesive mat. The second adhesive layer allows an architectural covering material to be initially positioned, and repositioned on the carrier sheet during installation, and provides a permanent bond immediately after installation. The second adhesive layer can permit repositioning of a covering material by the inherent nature of the chemicals comprising the adhesive, or by the structure of the adhesive on the mat. Referring to FIGS. 1-3, in a presently preferred aspect, the second adhesive layer can be formed as a plurality of raised structures 50 that are typically spaced apart by longitudinal gaps 51, with a second adhesive layer release layer 52 of material, such as a release paper, for example, removably covering the second adhesive layer to protect the second adhesive layer during manufacture and storage of the adhesive mat. The second release layer of material is also preferably printable, so that it may be printed such as with a grid 54, or another measuring and aligning system, for example, in order to facilitate more accurate placement of covering material on the adhesive mat by a user. The second adhesive release layer of material is also preferably modified to allow removal of portions of the release layer of material when installing tiles, in order to protect the portion of the mat to which tile is not being set from dust or other job-site debris, for example. For example, the second release layer of material can be formed with a plurality of rows of perforations 56 to define a plurality of tear lines in the second release layer of material, thereby forming a plurality of portions 60 of the second release layer of material that can be removed one at a time, to allow installation of the architectural covering material in a small area of the substrate surface. Alternatively, the second release layer of material comprises a plurality of separated portions or strips that allow each of the plurality of separate strips to be removed one at a time.

Figure 6:
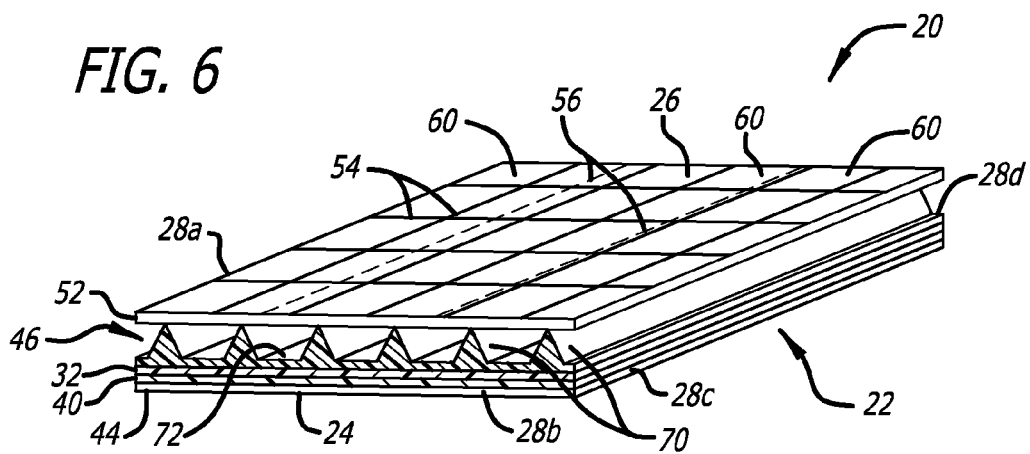
FIG. 6 is a schematic perspective view of a second embodiment of a generally planar adhesive mat for installation of architectural covering material to a substrate surface, according to the present invention.
Figure 7:
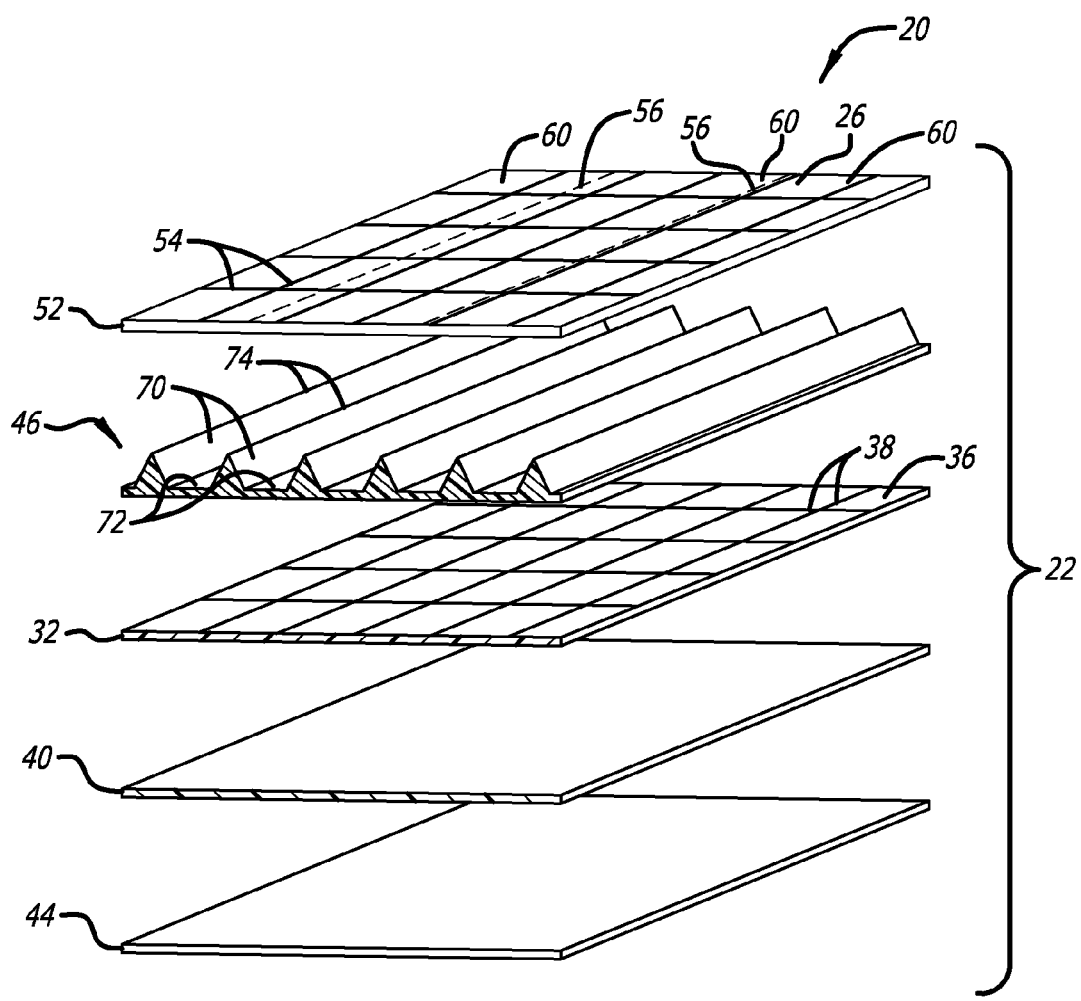
FIG. 7 is an exploded view of the generally planar adhesive mat of FIG. 6, according to the present invention.

Referring to FIGS. 6, 7, in a second presently preferred embodiment, in which like reference numerals refer to like elements of the previous embodiment, the invention provides for generally planar adhesive mat for installation of architectural covering material to a substrate surface, in which the PSA of the second adhesive layer can be formed with ridges 70 separated by grooves 72, so that if the covering material such as tile is placed gently on the tops 74 of the ridges, the covering material remains repositionable; however, when the covering material is pressed onto the PSA ridges such that the covering material is flattened and/or also contacts the grooves between the ridges, the covering material becomes immovably adhered to the second adhesive layer.

Figure 8:
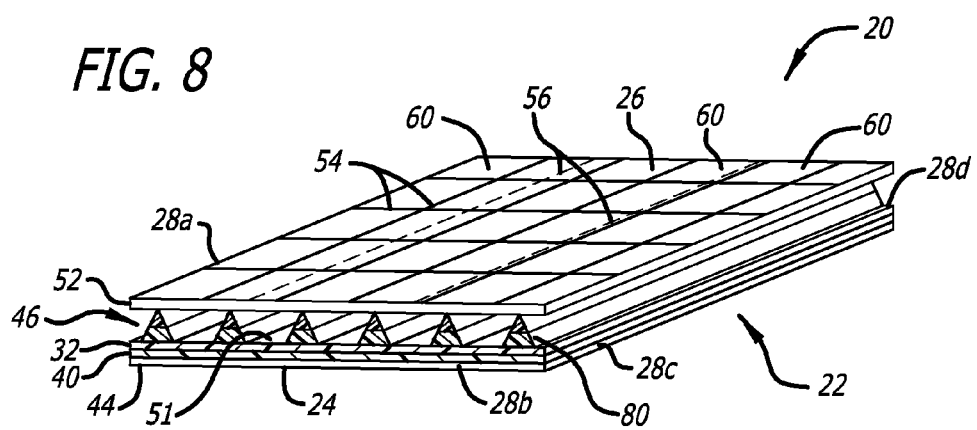
FIG. 8 is a schematic perspective view of a third embodiment of a generally planar adhesive mat for installation of architectural covering material to a substrate surface, according to the present invention.
Figure 9:
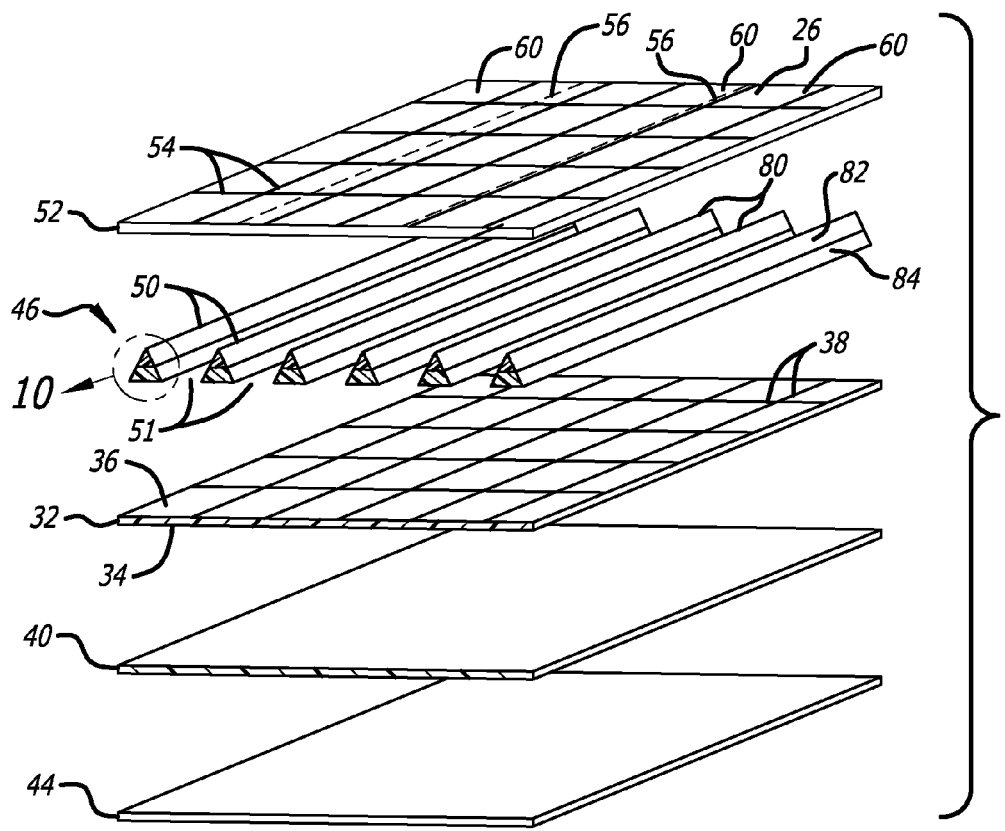
FIG. 9 is an exploded view of the generally planar adhesive mat of FIG. 8, according to the present invention.
Figure 10:
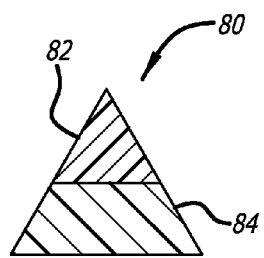
FIG. 10 is an enlarged side view of a ridge of the second layer of adhesive of FIG. 8, showing the upper and lower portions of the ridge.
Figure 11:
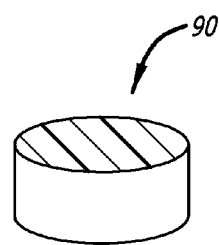
FIG. 11 is an enlarged perspective view of a ridge of the second layer of adhesive similar to the ridge of FIG. 10, formed as a dot of adhesive.

Referring to FIGS. 8-10, in a third presently preferred embodiment, in which like reference numerals refer to like elements of the previous embodiments, the second adhesive layer can be formed as spaced apart ridges 80 of two functionally different PSAs, including an upper adhesive portion 82 of the spaced apart ridges and a lower adhesive portion 84 of the spaced apart ridges. In this embodiment, the upper adhesive portion of the spaced apart ridges can be composed of a first slow set or weakly binding PSA that has enough tack to hold the covering material such as tile, but allows the covering material to be repositioned. The lower adhesive portion of the spaced apart ridges can be composed of a second fast set or more strongly binding PSA, relative to the first PSA, such that when the covering material such as tile is pressed into the mat so that the covering material contacts the lower adhesive portions of the ridges, the covering material becomes immovably adhered to the second adhesive layer. The properties of the upper adhesive portion of the spaced apart ridges are such that the covering material will be repositionable when the covering material only contacts the upper adhesive portion of the spaced apart ridges, whereas the lower adhesive portion of the spaced apart ridges will provide a permanent, immovable bond with the covering material.

Figure 12:
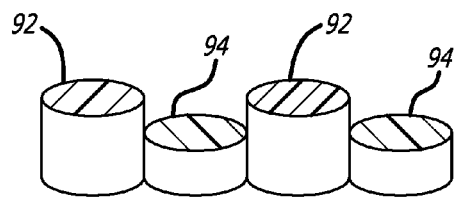
FIG. 12 is an enlarged perspective view of a portion of the second layer of adhesive formed as a series of high and low dots of adhesive.
Figure 13:
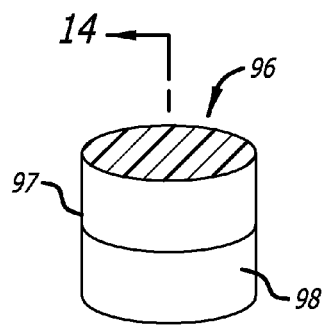
FIG. 13 is an enlarged perspective view of a portion of the second layer of adhesive formed as a series of stacked layers of adhesive dots.
Figure 14:
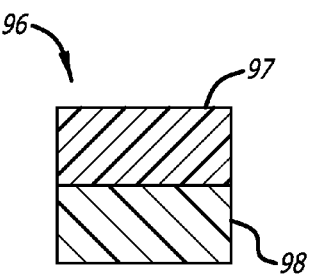
FIG. 14 is a cross-sectional view of the stacked layers of adhesive dots taken along line 14-14 of FIG. 13.

Referring to FIGS. 11-14, in a fourth presently preferred embodiment, the second adhesive layer can also be formed as series of dots, marks, beads or spots 90 having cylindrical, round, cubed, rectilinear, or other shapes, for example, which are shown as having exemplary cylindrical shapes for purposes of illustration, and that may be contiguous or spaced apart. As is illustrated in FIG. 12, the dots, marks, beads or spots may be formed as a series of high 92 dots and low "dots" 94 of adhesive that may be contiguous or spaced apart and that perform in substantially the same way as ridges of adhesive. Referring to FIGS. 13 and 14, the dots, marks, beads or spots may be formed as stacked layers 96 of adhesives with an upper adhesive dot portion 97 and a lower adhesive dot portion 98 that can be the same or different from the upper adhesive dot portion, and that may be contiguous or spaced apart. The adhesive material forming the dots, marks, beads or spots, including upper and lower adhesive dot portions, can be cured adhesives, pressure sensitive adhesives (PSAs), asphalt-based PSAs (rubberized and otherwise), and acrylate based PSAs, as well as hot melt PSAs, which can provide benefits in manufacturing the tile installation mat. The PSA can be applied either as a solvent-borne material or a water-borne material, as a hot melt PSA, or any other methods of application known in the art.

Figure 16:
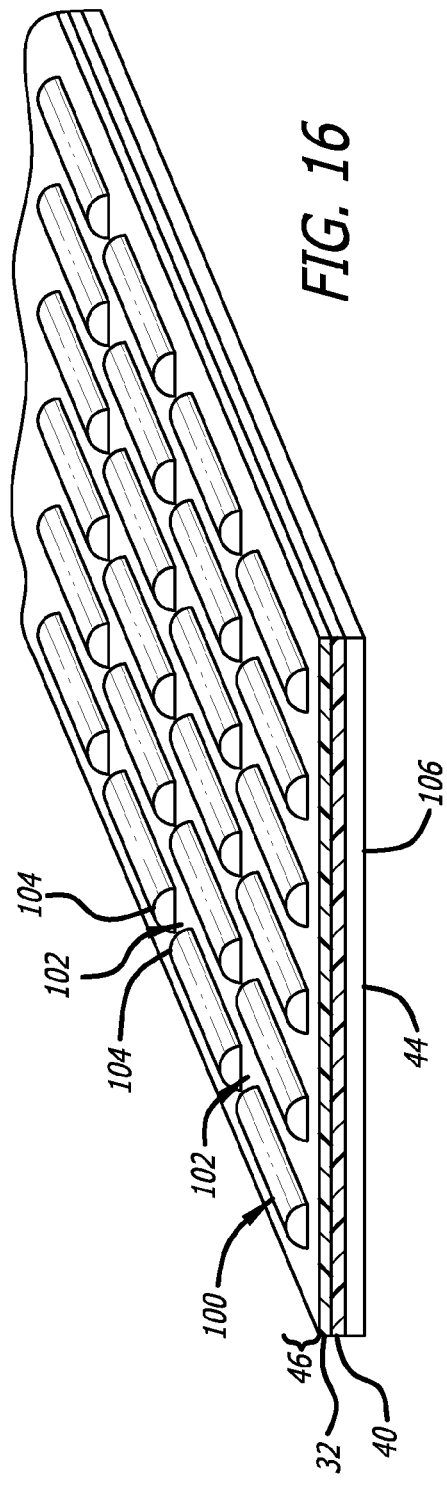
FIG. 16 is a schematic perspective view of a fifth embodiment of a generally planar adhesive mat for installation of architectural covering material to a substrate surface, according to the present invention.
Figure 17:
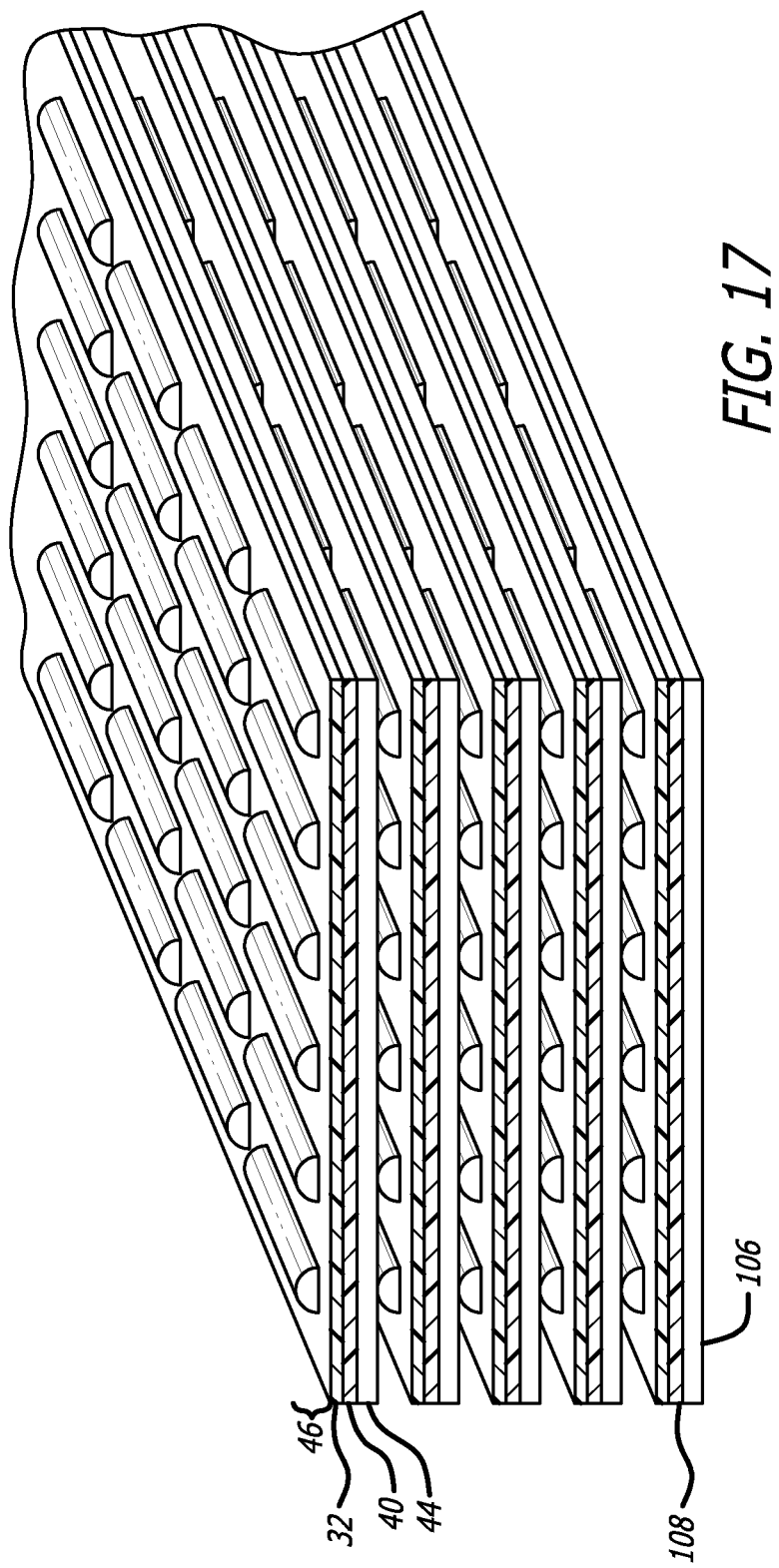
FIG. 17 is a schematic perspective view of a stack of the generally planar adhesive mats of FIG. 16.

Referring to FIGS. 16 to 18, in a fifth presently preferred embodiment, in which like reference numerals refer to like elements of the previous embodiments, the invention provides for a generally planar adhesive mat for installation of architectural covering material to a substrate surface, in which the second adhesive layer is composed of discontinuous ridges 100 (whether made up of dots, marks, beads or spots) spaced apart by gaps 102 of 0.1 to 1 inch typically formed longitudinally between adjacent ridges and between adjacent end portions 104 of the ridges. For example, the ridge 100 may be 1 inch in length followed by 0.25 inch to ⅜ inch end gaps in adhesive, and with longitudinal gaps between ridges similarly 0.25 inch to ⅜ inch, for example. The end gaps allow for cutting and subsequent overlap of successive mats to ensure a waterproof plurality of mats is achieved. In this embodiment, the release function of the second release layer is provided by the first or bottom side 106 of the first release layer, when the mats are collected and stacked in face-to-face relationship, as in when stacking individual mats, as is illustrated in FIG. 17, or when rolling a single long mat into a roll, as is illustrated in FIG. 18. The first release layer is comprised of a first face 106 that is coated with a first release agent and a second opposing face 108 that is coated with a second release agent. The first and second release agents may be the same or different, as is well known in the art, such that release from one face may be preferred relative to release from the other face.

Figure 15:
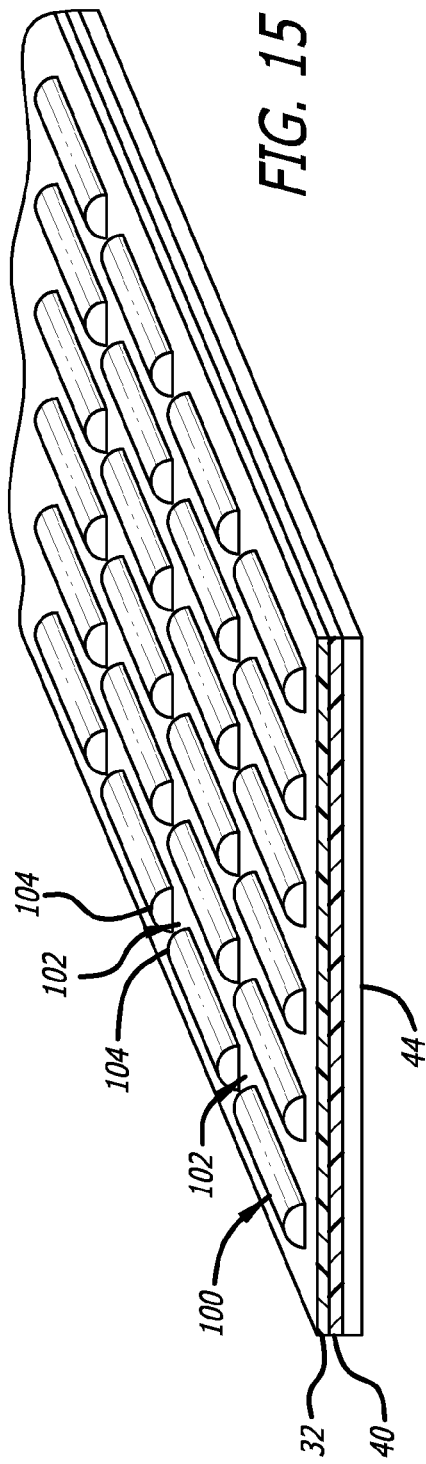
FIG. 15 is a schematic perspective view of a variation of the fourth embodiment of FIGS. 11-14.

Referring to FIG. 15, in a presently preferred variation of the fourth embodiment, the second adhesive layer can also be composed of discontinuous ridges 100 (whether made up of dots, marks, beads or spots) spaced apart by gaps 102 of 0.1 to 1 inch typically formed longitudinally between adjacent ridges and between adjacent end portions 104 of the ridges. For example, the ridge 100 may be 1 inch in length followed by 0.25 inch to ⅜ inch end gaps in adhesive, and with longitudinal gaps between ridges similarly 0.25 inch to ⅜ inch, for example. The end gaps allow for cutting and subsequent overlap of successive mats to ensure a waterproof plurality of mats is achieved.

Figure 20:
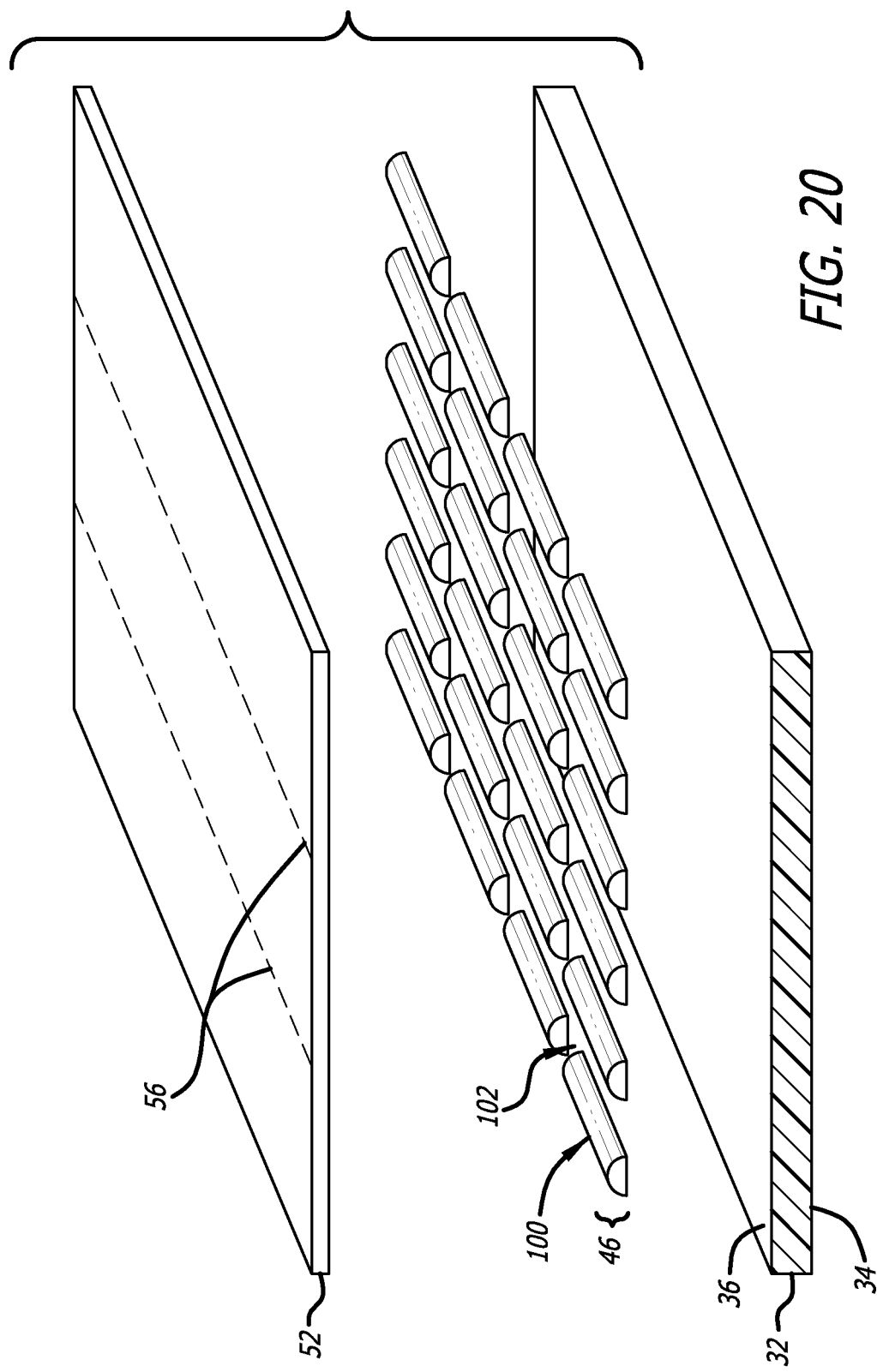
FIG. 20 is an exploded view of the generally planar adhesive mat of FIG. 19.

Referring to FIGS. 19 and 20, in a sixth preferred embodiment, in which like reference numerals refer to like elements of the previous embodiments, the invention provides for a generally planar adhesive mat for installation of architectural covering material to a substrate surface, in which the planar carrier member or carrier sheet layer is formed by a semi-rigid board such as gypsum-based wall board, cement backerboard, or foam backerboard. The semi-rigid board typically can be from 0.2" to 3" thick, depending on the needs of the application. As is best seen in FIG. 20, the carrier sheet layer, formed of a semi-rigid board 32, is coated on a second face 36 with a second adhesive layer 46, with a second release layer 52 covering the second adhesive layer. Referring to FIGS. 19 and 20, while the second adhesive layer is shown as ridges or beads having exemplary cylindrical shapes for purposes of illustration, as is illustrated in FIGS. 10-14, the second adhesive layer 46 can also be formed as a series of dots, marks, beads or spots having triangular, cylindrical, round, cubed, rectilinear, or other shapes, for example, and that may be contiguous or spaced apart. The first face 34 may optionally also be coated with a first adhesive layer, and a first release layer of material (not shown). As is illustrated in FIG. 12, the dots, marks, beads or spots may be formed as a series of high dots 92 and low dots 94 of adhesive that may be contiguous or spaced apart, and that perform in substantially the same way as ridges of adhesive. Referring to FIGS. 13 and 14, the dots, marks, beads or spots may be formed as stacked layers 96 of adhesives with an upper adhesive dot portion 97 and a lower adhesive dot portion 98 that can be the same or different from the upper adhesive dot portion, and that may be contiguous or spaced apart. The adhesive material forming the dots, marks, beads or spots, including upper and lower adhesive dot portions, can be cured adhesives, pressure sensitive adhesives (PSAs), asphalt-based PSAs (rubberized and otherwise), and acrylate based PSAs, as well as hot melt PSAs, which can provide benefits in manufacturing the tile installation mat. The PSA can be applied either as a solvent borne material or a water-borne material, as a hot melt PSA, or any other methods of application known in the art.

In the foregoing embodiments, the adhesive for the first adhesive layer can be any pressure sensitive adhesive that provides strong adhesion under many environmental and job site conditions. Ninety degree peel data on various substrates is provided in Table 1 below.

TABLE 1

Peel strength (90 degree) to various substrates measured 72 hours after adhering the first adhesive layer to the substrate.

|  | Vinyl Laminate | Ceramic Tile | Cleaned Drywall | Gloss-Painted Drywall | Plywood |
|---|---|---|---|---|---|
| Average Peel Strength (pounds per linear inch) | 5.7 | 6.1 | 2.0 | 5.4 | 2.6 |

In the foregoing embodiments, the second adhesive layer should have the following properties: 1) The second adhesive layer should have viscoelastic behavior allowing dimensional stability after curing (drying, cooling, or other curing behavior) so as to maintain the structure of the ridges during storage and handling. 2) The second adhesive layer should be deformable when placed under pressure such that the adhesive will conform to the impinging architectural covering material surface thereby increasing the interfacial contact between the adhesive and the architectural covering material with increasing pressure. 3) The second adhesive layer should have sufficient adhesion under minimal pressure such that an architectural covering material, such as a tile, for example, is removably adhered to the second adhesive layer in a first stage of installation with an adhesive force substantially equal to the mass per unit area of the architectural covering material, such as a force of about 0.01 to 1.0 pounds per square inch, for example, such that the architectural covering material will not fall off when adhered in a vertical position (as to a wall) in the first stage of installation, while still being removable with minimal hand pressure equal to or greater than the mass per unit area of the architectural covering material, such as equal to or greater than about 1.0 pound per square inch, for example, and in a subsequent second step of installation to permanently affix the architectural covering material to the second adhesive layer, the architectural covering material can be firmly pressed into place by applying a load of about 10 pounds or more across the face of the architectural covering material. 4) The second adhesive layer should have sufficient adhesion under the application of firm hand pressure to architectural covering material to the second adhesive layer in a second stage of installation to dramatically increase the adhesion such that it is difficult or impossible to remove the architectural covering material by hand. 5) The second adhesive layer can include fillers and/or adjuvants common in the art that can be used to extend and/or modify the properties of the adhesive. An exemplary adhesive for the first and the second adhesive layer is sold under the name DF 674, available through Deccofelt Corporation of Glendora, Calif.

The ability to removably adhere a tile to the second adhesive layer in a first stage of installation with minimal pressure with an adhesive force substantially equal to the mass per unit area of the architectural covering material in a vertical position, such as a force of about 0.01 to 1.0 pounds per square inch, for example, has been demonstrated by the following example. The second adhesive layer of the adhesive mat was adhered to a 12"×12" piece of plywood, and this was set in a horizontal position on a lab bench, with the second adhesive layer facing up. A tile was gently dropped from a minimal height of less than 0.25 inches, thereby using the force of gravity alone to adhere the tile to the second adhesive layer, with a force of about 0.01 to 1.0 pounds per square inch. One edge of the plywood was lifted such that the plywood/adhesive mat/tile assembly was in a vertical position, and the assembly was gently shaken to determine if the tile would move or fall off the vertical surface. The tile adhered to the plywood/adhesive mat assembly did not move or fall off when gently shaken, but was removable manually, with a force equal to or greater than about 1.0 pound per square inch. A tile adhered to such an adhesive mat according the present invention should not move or fall off when gently shaken, but should be removable manually by gripping the tile with one's hands, and pulling the tile with minimal force equal to or greater than the mass per unit area of the tile, and without the use of tools to pry the tile from the plywood/adhesive mat assembly. The ability of an adhesive mat according the present invention to irreversibly hold the tile in a second stage of installation after repositioning and firmly pressing the tile in place was determined by tensile measurement of a 4"×4" ceramic wall tile having a nominally flat back, i.e. without ridges or other designed deformation installed on an adhesive mat according to the present invention. The typical tensile strength of a currently preferred embodiment is 2.5 psi after 24 hours and over 5 psi after 7 days.

In another presently preferred aspect, the present invention provides for a premixed grout with strong adhesion to the covering material and the mat. The grout should substantially cure within 24 hours and be water resistant. A presently preferred grout is a polymer-based premixed grout sold under the name SIMPLE GROUT, manufactured by Custom Building Products of Seal Beach, Calif. The exemplary premixed grout, in combination with the adhesive mat of the invention, forms an unexpectedly stronger system than if cementitious grout is used. To demonstrate this, tile assemblies consisting of a cementitious backer board, the adhesive mat of the invention, and nine 4 inch wall tiles (forming a 3 tile by 3 tile square with ¼ inch grout joints) were grouted with both premixed grout or cementitious grout. After curing for seven days, the assembly was placed in a stress-train machine to measure the force required to pull the central tile from the assembly in a direction orthogonal to the tile surface. Without grout, the force required to remove the tile is approximately 90 pounds (5.6 psi). The force required for removing the cementitious grout was approximately 110 pounds (6.9 psi), whereas the force required to remove the tiles grouted with premixed grout was approximately 150 pounds (9.4 psi, 36% higher than with cementitious grout). While it is believed that the cementitious grout is suitable for many applications, the increased strength with the premixed grout imparts robustness to the overall system.

The overall strength of the system depends on the physical, chemical and dimensional properties of the second adhesive layer. With larger ridges and the premixed grout, the tensile force required to remove the central tile was approximately 200 pounds (12.5 psi), whereas with smaller ridges the force required is approximately 150 pounds (9.4 psi). Under these conditions the tiles typically break at approximately 200 pounds (12.5 psi). To install small mosaic tiles, often as small as ¾" on a side, it is preferred to have at least two ridges of adhesive supporting each tile. Thus for this application the spaces between ends of adjacent ridges should preferably be less than or equal to ⅜ inch. Likewise, the longitudinal space between adjacent ridges in the direction of the ridge should be less than or equal to ⅜ inch. The length and width of the ridges of adhesive can be variable, provided enough adhesive is applied, such that together the portions of the second adhesive layer preferably provide an adhesive coverage of the second surface in the range of approximately 5-20% total coverage, and more preferably approximately 10% total coverage, consistent with reversibly installing tile in a first step of installation using minimal hand pressure in the range of about 0.01 to 1.0 pounds per square, and in a subsequent second step of installation of permanently affixing the tile to the second adhesive layer by firmly pressing the tile into place by applying a load of about 10 pounds or more across the face of the tile. The height of the ridges typically should be larger than deviations in the underside of the architectural covering material. For instance, ceramic tile often has indentations from a grid pattern that may be 1/32-1/16 inch in depth. Thus, a ridge height of 1/16 inch would be appropriate. Larger or smaller indentations in a surface covering material could require adhesive ridges of greater or lesser height.

In the method of the invention, the generally planar adhesive mat can be applied to a substrate surface such as a building surface, floor or wall, by removing the first release liner, aligning the adhesive mat on the surface, and pressing the adhesive mat onto the substrate surface to adhere the adhesive mat to the substrate surface. The installer can pause after adhering the adhesive mat to the substrate surface before applying the covering material to the adhesive mat. The covering material then can be set onto the adhesive mat by removing the second release liner, aligning the covering material, and pressing the covering material, typically gently at first, onto the second adhesive layer. The covering material then can be easily repositioned by lifting or pushing the covering material laterally, re-setting the covering material in a desired position, after which the covering material can be pressed firmly into the second adhesive layer to permanently adhere the covering material in position on the substrate surface. When covering material such as tile is gently set into the second adhesive layer in this manner, the covering material can be re-set at any time to reposition and re-align the tile. There are practically no open time or adjustment time limitations. Additionally, since the second release layer of material can be perforated or formed as separate strips, the installer can easily remove desired portions of the second release layer to expose only as much of the second adhesive layer as is necessary.

With the current invention, the covering material such as tile can be grouted immediately after it is firmly set into the second adhesive layer. The use of a premixed grout, along with being easy to use, also brings significant strength improvement to the final assembly. The system and method for mortarless tile installation of the invention make the installation of covering materials such as tile cleaner, easier and more accessible to those not trained in the art of tile installation and overcomes many of the challenges associated with mortar-based tile installation.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A generally planar adhesive mat for installation of architectural covering material to a substrate surface, the generally planar adhesive mat having a first side and an opposing second side and a plurality of perimeter side edges, the generally planar adhesive mat comprising:

a planar carrier sheet having a first side, an opposing second side and a plurality of perimeter side edges;

a first adhesive layer on said first side of the carrier sheet configured to adhere the adhesive mat to the substrate surface, and a second adhesive layer on said opposing second side of the carrier sheet configured to removably adhere the architectural covering material to the adhesive mat in a first stage of installation, and to permanently adhere the architectural covering material to the adhesive mat in a second stage of installation, wherein said second adhesive layer has sufficient adhesion in the first stage of installation such that the architectural covering material is adhered to said second adhesive layer with an adhesive force substantially equal to a mass per unit area of the architectural covering material in a vertical position, and the architectural covering material is removable in the first stage of installation by hand pressure equal to or greater than said mass per unit area of the architectural covering material; and at least one release layer of material removably covering at least one adhesive layer to protect said at least one adhesive layer during manufacture and storage of the adhesive mat.

2. The generally planar adhesive mat of claim 1, wherein said at least one release layer of material comprises a first release layer of material removably covering said first adhesive layer to protect said first adhesive layer during manufacture and storage of the adhesive mat, and a second release layer of material removably covering said second adhesive layer to protect said second adhesive layer during manufacture and storage of the adhesive mat, said second adhesive release layer of material being configured to allow removal of portions of the release layer of material when installing the architectural covering material.

3. The generally planar adhesive mat of claim 2, wherein said second release layer of material is modified to allow removal of portions of the release layer of material.

4. The generally planar adhesive mat of claim 1, wherein a portion of at least one of the first side and the opposing second side of each said carrier sheet along at least one of said plurality of perimeter side edges of said carrier sheet are free of adhesive to reduce the thickness along said at least one of said plurality of perimeter side edges of said carrier sheet.

5. The generally planar adhesive mat of claim 1, wherein said carrier sheet is formed with a grid.

6. The generally planar adhesive mat of claim 1, wherein said carrier sheet is formed from a polymer.

7. The generally planar adhesive mat of claim 1, wherein said carrier sheet is formed from a sheet material selected from the group consisting of polyethylene, polypropylene, woven polyester, woven fiberglass, non-woven polyester, non-woven fiberglass.

8. The generally planar adhesive mat of claim 1, wherein said carrier sheet is impermeable to liquid water and permeable to water vapor.

9. The generally planar adhesive mat of claim 1, wherein said first adhesive layer comprises a pressure sensitive adhesive.

10. The generally planar adhesive mat of claim 1, wherein said first adhesive layer comprises an adhesive selected from the group consisting of a cured adhesive, a hot melt adhesive, an asphalt-based pressure sensitive adhesive, and an acrylate based pressure sensitive adhesive.

11. The generally planar adhesive mat of claim 1, wherein said second adhesive layer on said opposing second side of said carrier sheet comprises a plurality of ridges and corresponding valleys disposed between said ridges.

12. The generally planar adhesive mat of claim 9, wherein said ridges are formed of a first pressure sensitive adhesive, and said corresponding valleys are formed of a pressure sensitive adhesive functionally different from said first pressure sensitive adhesive.

13. The generally planar adhesive mat of claim 12, wherein said first pressure sensitive adhesive comprises a slow set or weakly binding pressure sensitive adhesive, and said second adhesive layer comprises a fast set or more strongly binding pressure sensitive adhesive, relative to said first pressure sensitive adhesive.

14. The generally planar adhesive mat of claim 11, wherein said ridges and corresponding valleys are formed from stacked layers of adhesives.

15. The generally planar adhesive mat of claim 1, wherein said second adhesive layer is deformable when placed under pressure such that the second adhesive layer will conform to a surface of the architectural covering material.

16. The generally planar adhesive mat of claim 1, wherein said second adhesive layer has sufficient adhesion such that an architectural covering material will adhere to said second adhesive layer when the architectural covering material is adhered to said second adhesive layer with minimal pressure in a vertical position, and the architectural covering material is still removable with minimal hand pressure.

17. The generally planar adhesive mat of claim 1, wherein said second adhesive layer has sufficient adhesion such that an architectural covering material will adhere to said second adhesive layer in the first stage of installation with a force of about 0.01 to 1.0 pounds per square inch in a vertical position, and the architectural covering material is removable in the first stage of installation by hand pressure equal to or greater than about 1.0 pound per square inch, and said second adhesive layer has sufficient adhesion such that the architectural covering material is permanently affixed to said second adhesive layer in a subsequent second step of installation by firmly pressing the architectural covering material into place by applying a load of about 10 pounds or more across the face of the architectural covering material.

18. A generally planar adhesive mat for installation of architectural covering material to a substrate surface, the generally planar adhesive mat having a first side and an opposing second side and a plurality of perimeter side edges, the generally planar adhesive mat comprising:
   a planar carrier sheet having a first side, an opposing second side and a plurality of perimeter side edges;
   a first adhesive layer on said first side of the carrier sheet configured to adhere the adhesive mat to the substrate surface, and a second adhesive layer on said opposing second side of the carrier sheet configured to removably adhere the architectural covering material to the adhesive mat in a first stage of installation, and to permanently adhere the architectural covering material to the adhesive mat in a second stage of installation, wherein said second adhesive layer has sufficient adhesion such that an architectural covering material will adhere to said second adhesive layer in the first stage of installation with a force of about 0.01 to 1.0 pounds per square inch in a vertical position, and the architectural covering material is removable by hand pressure equal to or greater than about 1.0 pound per square inch, and said second adhesive layer has sufficient adhesion such that the architectural covering material is permanently affixed to said second adhesive layer in a subsequent second step of installation by firmly pressing the architectural covering material into place by applying a load of about 10 pounds or more across the face of the architectural covering material; and
   at least one release layer of material removably covering at least one adhesive layer to protect said at least one adhesive layer during manufacture and storage of the adhesive mat.

19. The generally planar adhesive mat of claim 18, wherein said second adhesive layer on said opposing second side of said carrier sheet comprises a plurality of ridges and corresponding valleys disposed between said ridges.

20. The generally planar adhesive mat of claim 19, wherein said ridges are formed of a first pressure sensitive adhesive, and said corresponding valleys are formed of a pressure sensitive adhesive functionally different from said first pressure sensitive adhesive.

* * * * *